(12) United States Patent
Hayashi et al.

(10) Patent No.: US 11,717,909 B2
(45) Date of Patent: Aug. 8, 2023

(54) POWDER FEEDING DEVICE AND ADDITIVE MANUFACTURING DEVICE

(71) Applicant: IHI CORPORATION, Tokyo (JP)

(72) Inventors: Daiki Hayashi, Tokyo (JP); Yuichiro Nakayama, Tokyo (JP)

(73) Assignee: IHI CORPORATION, Tokyo (JP)

( * ) Notice: Subject to any disclaimer, the term of this patent is extended or adjusted under 35 U.S.C. 154(b) by 188 days.

(21) Appl. No.: 16/753,984

(22) PCT Filed: Oct. 12, 2018

(86) PCT No.: PCT/JP2018/038156
§ 371 (c)(1),
(2) Date: Apr. 6, 2020

(87) PCT Pub. No.: WO2019/074107
PCT Pub. Date: Apr. 18, 2019

(65) Prior Publication Data
US 2020/0391439 A1 Dec. 17, 2020

(30) Foreign Application Priority Data
Oct. 13, 2017 (JP) .................................. 2017-199268

(51) Int. Cl.
*B29C 64/343* (2017.01)
*B23K 15/00* (2006.01)
(Continued)

(52) U.S. Cl.
CPC .......... *B23K 15/0086* (2013.01); *B22F 10/28* (2021.01); *B22F 10/30* (2021.01); *B22F 10/73* (2021.01); *B22F 12/224* (2021.01); *B22F 12/52* (2021.01); *B22F 12/55* (2021.01); *B22F 12/57* (2021.01); *B23K 26/342* (2015.10);
(Continued)

(58) Field of Classification Search
CPC ........................... B29C 64/329; B29C 64/153
See application file for complete search history.

(56) References Cited

U.S. PATENT DOCUMENTS

2001/0050448 A1   12/2001   Kubo et al.
2004/0182510 A1    9/2004   Pfeifer et al.
(Continued)

FOREIGN PATENT DOCUMENTS

CN   106001564 A   10/2016
CN   205660159 U   10/2016
(Continued)

*Primary Examiner* — Joseph S Del Sole
*Assistant Examiner* — Margaret B Hayes
(74) *Attorney, Agent, or Firm* — Volpe Koenig (57) ABSTRACT

A powder feeding device includes: a hopper including a discharge port for discharging powder; and a conveyance device configured to move a conveyance surface disposed below the discharge port in a first direction and invert the conveyance surface in a front end portion. The hopper includes a front wall portion positioned on a downstream side of the discharge port in the first direction. A predetermined gap is formed between a lower end of the front wall portion and the conveyance surface. In the powder feeding device, powder deposited on the conveyance surface is conveyed in the first direction by the conveyance device with a thickness corresponding to the gap and dropped from the front end portion.

10 Claims, 7 Drawing Sheets

(51) Int. Cl.
  *B33Y 30/00* (2015.01)
  *B33Y 40/00* (2020.01)
  *B23K 26/342* (2014.01)
  *B29C 64/329* (2017.01)
  *B29C 64/153* (2017.01)
  *G01F 22/00* (2006.01)
  *B22F 10/28* (2021.01)
  *B22F 10/73* (2021.01)
  *B22F 12/00* (2021.01)
  *B22F 12/52* (2021.01)
  *B22F 12/55* (2021.01)
  *B22F 12/57* (2021.01)
  *B22F 10/30* (2021.01)
  *B22F 12/44* (2021.01)
  *B22F 12/49* (2021.01)
  *B22F 12/90* (2021.01)
  *B22F 10/362* (2021.01)

(52) U.S. Cl.
  CPC .......... *B29C 64/153* (2017.08); *B29C 64/329* (2017.08); *B33Y 30/00* (2014.12); *B33Y 40/00* (2014.12); *G01F 22/00* (2013.01); *B22F 10/362* (2021.01); *B22F 12/44* (2021.01); *B22F 12/49* (2021.01); *B22F 12/90* (2021.01)

(56) References Cited

U.S. PATENT DOCUMENTS

| | | | |
|---|---|---|---|
| 2007/0257055 A1* | 11/2007 | Scott | B33Y 40/00 222/71 |
| 2013/0108726 A1* | 5/2013 | Uckelmann | A61C 13/20 425/375 |
| 2015/0139849 A1 | 5/2015 | Pialot, Jr. et al. | |
| 2015/0290881 A1* | 10/2015 | Ederer | B29C 64/141 425/375 |
| 2016/0214327 A1* | 7/2016 | Uckelmann | A61C 13/20 |
| 2016/0311164 A1 | 10/2016 | Miyano | |
| 2016/0368215 A1 | 12/2016 | Miyano et al. | |
| 2017/0028472 A1* | 2/2017 | Shaw | B23K 37/003 |
| 2017/0050270 A1 | 2/2017 | Miyano et al. | |
| 2017/0071707 A1 | 3/2017 | Uckelmann et al. | |
| 2017/0072636 A1* | 3/2017 | Ng | B05C 19/04 |
| 2017/0151727 A1 | 6/2017 | Ederer et al. | |
| 2017/0259507 A1* | 9/2017 | Hocker | B29C 64/245 |
| 2018/0207872 A1* | 7/2018 | Klein | B22F 12/63 |
| 2019/0315056 A1* | 10/2019 | Stuart | B29C 64/218 |
| 2020/0229905 A1 | 7/2020 | Uckelmann et al. | |

FOREIGN PATENT DOCUMENTS

| | | |
|---|---|---|
| CN | 206083859 U | 4/2017 |
| JP | 03-243515 A | 10/1991 |
| JP | 2000-158542 A | 6/2000 |
| JP | 2001-334581 A | 12/2001 |
| JP | 2005-119757 A | 5/2005 |
| JP | 2009-090337 A | 4/2009 |
| JP | 2012-166487 A | 9/2012 |
| JP | 2014-513637 A | 6/2014 |
| JP | 2015-152506 A | 8/2015 |
| JP | 2015-527942 A | 9/2015 |
| JP | 2015-196254 A | 11/2015 |
| JP | 2016-055452 A | 4/2016 |
| JP | 6050550 B1 | 12/2016 |
| JP | 6077715 B1 | 2/2017 |
| JP | 6077718 B1 | 2/2017 |
| WO | 2015/146885 A1 | 10/2015 |
| WO | 2015/151831 A1 | 10/2015 |
| WO | 2016/151783 A1 | 9/2016 |
| WO | 2016/176432 A1 | 11/2016 |
| WO | WO-2016176432 A1 * | 11/2016 ............ B22F 3/1055 |

* cited by examiner

POWDER FEEDING DEVICE AND ADDITIVE MANUFACTURING DEVICE

CROSS REFERENCE TO RELATED APPLICATION

This application is a national stage entry of International Patent Application No. PCT/JP2018/038156 filed on Oct. 12, 2018 and claims the benefit of priority of Japanese Patent Application No. 2017-199268 filed Oct. 13, 2017, the contents of which are all incorporated herein by reference in their entirety.

TECHNICAL FIELD

The present disclosure relates to a powder feeding device and an additive manufacturing device.

BACKGROUND ART

Devices described in Patent Documents 1 to 3 are known as techniques in such a field. The device described in Patent Document 1 includes a hopper storing powder, powder spraying means for spraying the powder onto a modeling surface, powder replenishing means provided therebetween, and pivoting means for pivoting the powder replenishing means. The columnar powder replenishing means has a groove for accommodating the powder in a side surface. By the pivoting means pivoting the powder replenishing means, the powder in the groove is dropped and the powder spraying means is replenished with the powder. The powder spraying means sprays the powder onto the modeling surface while scanning on the modeling surface. This powder spraying means includes a recoater and an intermediate storage unit. Replenishment of the recoater with powder is performed via the intermediate storage unit from a powder replenishing unit. On the other hand, Patent Document 2 and Patent Document 3 describe columnar powder feeding means provided below a hopper.

PATENT LITERATURE

Patent Document 1: Japanese Patent No. 6050550
Patent Document 2: Japanese Patent No. 6077715
Patent Document 3: Japanese Patent No. 6077718

SUMMARY OF INVENTION

In the device described in Patent Document 1, the powder feeding amount may vary with the size of the groove although powder feeding amount adjustment is performed by the powder replenishing means. In other words, the size of the groove is determined as to certain powder replenishing means, and thus the powder feeding amount adjustment is limited. The present disclosure describes a powder feeding device and an additive manufacturing device capable of feeding powder by a desired feeding amount.

A powder feeding device according to one aspect of the present disclosure includes a hopper accommodating powder, the hopper including a discharge port for discharging the powder and the discharge port being provided in a lower portion of the hopper, and a conveyance device including a conveyance surface disposed below the discharge port of the hopper and configured to move the conveyance surface in a first direction and invert the conveyance surface in a front end portion. The hopper includes a front wall portion positioned on a downstream side of the discharge port in the first direction. A predetermined gap is formed between a lower end of the front wall portion of the hopper and the conveyance surface of the conveyance device. The powder deposited on the conveyance surface is conveyed in the first direction by the conveyance device with a thickness corresponding to the gap and dropped from the front end portion.

According to one aspect of the present disclosure, powder can be fed by a desired feeding amount.

DESCRIPTION OF EMBODIMENTS

A powder feeding device according to one aspect of the present disclosure includes a hopper accommodating powder, the hopper including a discharge port for discharging the powder and the discharge port being provided in a lower portion of the hopper, and a conveyance device, i. e. a conveyor, including a conveyance surface disposed below the discharge port of the hopper and configured to move the conveyance surface in a first direction and invert the conveyance surface in a front end portion. The hopper includes a front wall portion positioned on a downstream side of the discharge port in the first direction. A predetermined gap is formed between a lower end of the front wall portion of the hopper and the conveyance surface of the conveyance device. The powder deposited on the conveyance surface is conveyed in the first direction by the conveyance device with a thickness corresponding to the gap and dropped from the front end portion.

According to this powder feeding device, the powder discharged from the discharge port of the hopper is deposited onto the conveyance surface of the conveyance device. The predetermined gap is defined by the conveyance surface and the lower end of the front wall portion of the hopper. When the conveyance surface moves in the first direction, the deposited powder is conveyed with a thickness corresponding to the gap so as to be leveled at the lower end of the front wall portion. Then, the powder arrives at the front end portion of the conveyance device and is dropped from the front end portion. As a result, it is possible to adjust the amount of dropping of the powder, that is, a feeding amount to any amount by adjusting the movement amount of the conveyance surface in the conveyance device. Accordingly, it is possible to feed the powder by a desired feeding amount with this powder feeding device.

In some embodiments, the conveyance device includes a belt forming the conveyance surface and moving on a circular orbit in a loop shape along the first direction and a moving mechanism moving the belt on the circular orbit. The conveyance device is configured to include the moving mechanism and the belt, and thus the powder can be conveyed with ease and reliability.

In some embodiments, the gap between the lower end of the front wall portion and the conveyance surface changes in a second direction parallel to the conveyance surface and orthogonal to the first direction. In this case, the gap changes in the second direction, and thus the thickness of the powder deposited onto the conveyance surface and conveyed also changes. As a result, a distribution can be given in the feeding amount of the powder in the second direction. As a result, the powder can be fed by an appropriate feeding amount in accordance with the shape of a modeling surface and surplus powder generation can be suppressed in a case where, for example, the shape of the modeling surface is not a simple rectangular shape.

In some embodiments, the gap in the second direction changes by the front wall portion having a shape in which a height of the lower end changes in the second direction. In this case, a distribution can be given in the feeding amount of the powder in the second direction by the shape of the lower end of the front wall portion of the hopper being devised.

In some embodiments, the gap in the second direction changes by the conveyance device having a shape in which a height of the conveyance surface changes in the second direction. In this case, a distribution can be given the feeding amount of the powder in the second direction by the shape of the conveyance surface of the conveyance device (such as the surface of the belt) being devised.

An additive manufacturing device according to one aspect of the present disclosure includes the powder feeding device according to any one of the above, a work table provided below the front end portion of the conveyance device and having an upper surface where the powder is placed, a modeling surface exposed upward beside the work table, an application mechanism movable onto the modeling surface from the upper surface of the work table, and a beam emission unit emitting a beam toward powder fed onto the modeling surface by the application mechanism. According to this additive manufacturing device, the powder can be fed by a desired feeding amount, and thus surplus powder generation can be suppressed. As a result, effects such as improvement of the recyclability of the powder, suppression of a deterioration in the quality of the powder, and device size reduction are exhibited during an additive manufacturing.

In some embodiments, the an additive manufacturing device further includes a powder collection device collecting, from the work table, the powder as a surplus remaining after being fed to the modeling surface or protruding from the modeling surface, a measuring device measuring the amount of the powder collected by the powder collection device, and a control device adjusting a movement amount of the conveyance surface by controlling the conveyance device on the basis of the powder collection amount measured by the measuring device. In this case, the collection amount of the powder is measured by the measuring device and the control unit adjusts the movement amount of the conveyance surface on the basis of the collection amount. Accordingly, the feeding amount of the powder can be controlled with high accuracy.

Hereinafter, an embodiment of the present disclosure will be described with reference to the drawings. It should be noted that the same elements will be denoted by the same reference symbols without redundant description in the description of the drawings.

Figure 1:
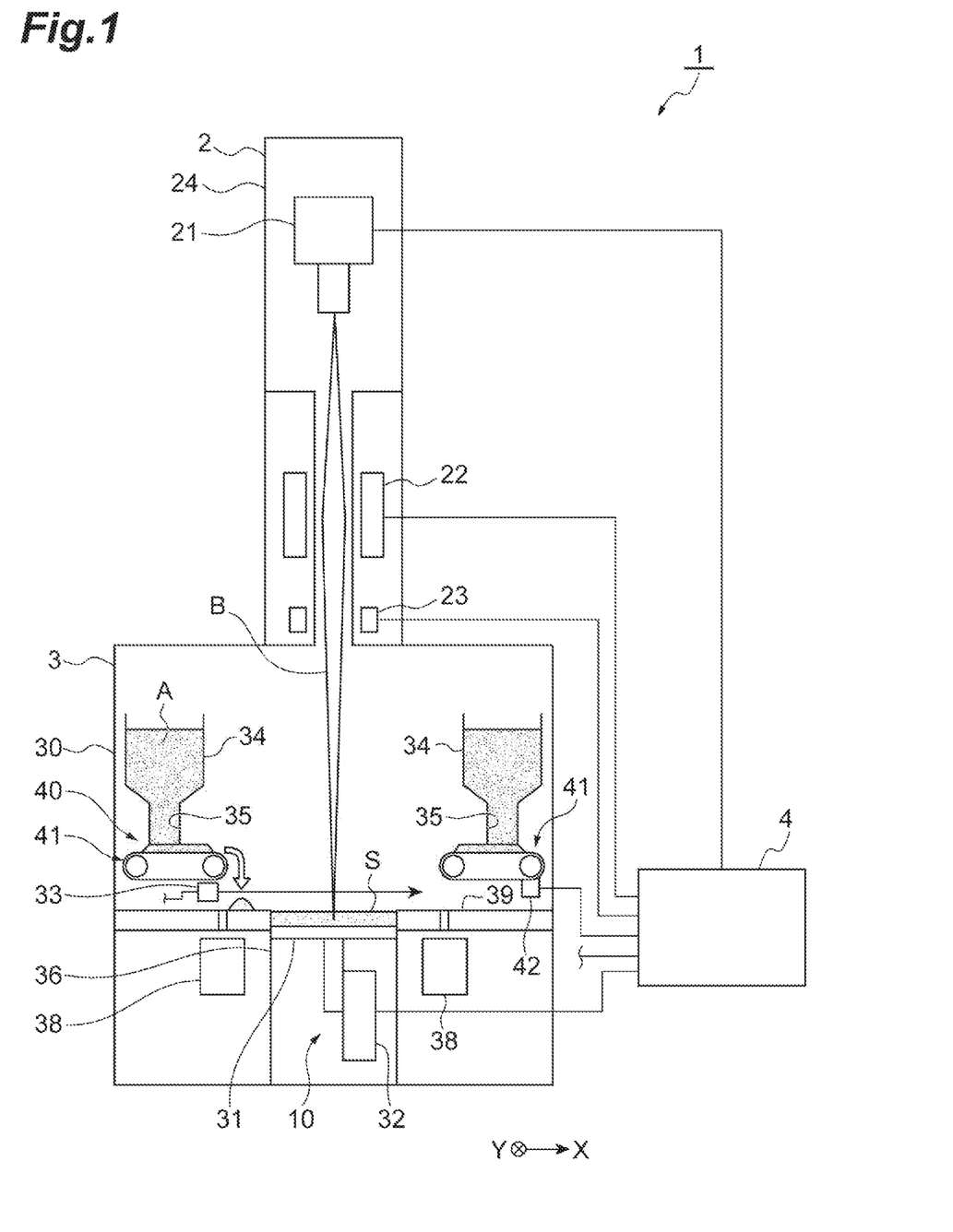
FIG. 1 is a diagram illustrating a schematic configuration of a powder feeding device and an additive manufacturing device according to an embodiment of the present disclosure.

FIG. 1 is a schematic configuration diagram of an additive manufacturing device according to the embodiment of the present disclosure. An additive manufacturing device 1 is a device that models a three-dimensional object by melting and solidifying powder A on a modeling surface S by irradiating the powder A with an electron beam B. The additive manufacturing device 1 includes an electron beam emission unit 2, a modeling unit 3, and a control unit 4.

The electron beam emission unit 2 melts the powder A by emitting the electron beam B toward the powder A on the modeling surface S of the modeling unit 3. The electron beam emission unit 2 may preheat the powder A by irradiating the powder A with the electron beam B before the modeling of the object is performed.

The electron beam emission unit 2 includes an electron gun unit 21, a convergence coil 22, and a deflection coil 23. The electron gun unit 21 is electrically connected to the control unit 4, operates in response to a control signal from the control unit 4, and emits the electron beam B. The electron gun unit 21 is provided so as to, for example, emit the electron beam B downward. The convergence coil 22 is electrically connected to the control unit 4 and operates in response to a control signal from the control unit 4. The convergence coil 22 is installed around the electron beam B emitted from the electron gun unit 21 and converges the electron beam B. The deflection coil 23 is electrically connected to the control unit 4 and operates in response to a control signal from the control unit 4. The deflection coil 23 is installed around the electron beam B emitted from the electron gun unit 21 and adjusts the irradiation position of the electron beam B in accordance with a control signal. The electron gun unit 21, the convergence coil 22, and the deflection coil 23 are installed in, for example, a tubular column 24.

The modeling unit 3 is a part where a modeling object C, which is a desired object, is modeled. The modeling unit 3 includes a work table 39, a modeling tank 36, a plate 31, a lifting and lowering device 10, two powder feeding devices 40, and an application mechanism 33 in a chamber 30. The inside of the chamber 30 is in a vacuum state.

Figure 2:
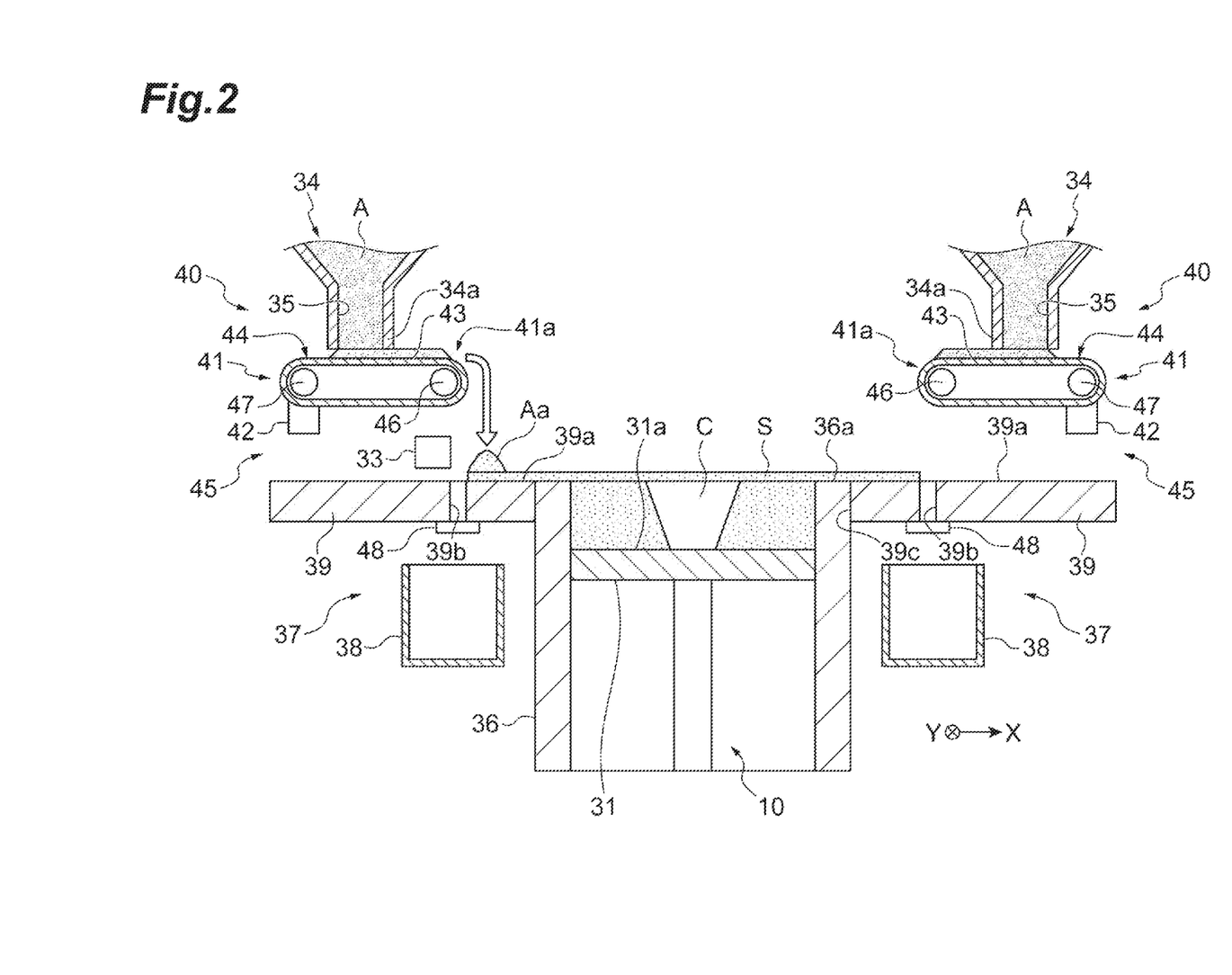
FIG. 2 is a diagram illustrating a modeling tank, a plate, and the powder feeding device in FIG. 1.

As illustrated in FIGS. 1 and 2, the work table 39 is disposed below the powder feeding device 40 and has a horizontal and flat upper surface 39a on which the powder A fed by the powder feeding device 40 is placed. The work table 39 is provided with an opening 39c having a circular shape or the like. The modeling tank 36, which has a cylindrical shape or the like, is fitted in this opening 39c. The modeling tank 36 has an axis extending in a vertical direction. An upper end surface 36a of the modeling tank 36 is, for example, flush with the upper surface 39a of the work table 39.

The plate 31 is a flat plate-shaped member disposed in the modeling tank 36. The plate 31 has, for example, a circular shape. The shape of the plate 31 corresponds to the shape of the modeling surface S (that is, a modeling region). The plate 31 has a flat upper surface 31a and supports the object to be modeled on the upper surface 31a. The plate 31 is disposed on an extension line in the emission direction of the electron beam B and is provided in parallel to, for example, a horizontal XY plane. The plate 31 is disposed in the modeling tank 36. The plate 31 and the modeling tank 36 are disposed concentrically.

The lifting and lowering device 10 supports the plate 31 and lifts and lowers the plate 31 in an up-down direction in the modeling tank 36. The lifting and lowering device 10 has a lifting and lowering machine 32 lifting and lowering the plate 31. The lifting and lowering device 10 may have a lifting and lowering stage (not illustrated) installed below the plate 31 and supporting the plate 31. The lifting and lowering machine 32 is electrically connected to the control unit 4 and operates in response to a control signal from the control unit 4. The lifting and lowering machine 32 moves the plate 31 upward in the early stage of the object modeling and lowers the plate 31 each time the powder A is melted, solidified, and laminated on the plate 31. The modeling object C is modeled on the plate 31. The modeling surface S is formed on the upper surface of the modeling object C. This modeling surface S has the same outer shape as the plate 31. The melting modeling surface that results from the melting and solidification of the powder A descends as the plate 31 descends. A new modeling surface S (next layer) is formed on the lowered melting modeling surface. In the work table 39, the plate 31, and the lifting and lowering device 10 configured as described above, the modeling surface S is exposed at the position of the opening 39c on the side of the work table 39.

The shapes of the plate 31, the modeling tank 36, and the modeling surface S described above can be appropriately changed in accordance with the shape of the modeling object C or the like. Other shapes may be adopted although a case where the plate 31 and the modeling surface S are circular and the modeling tank 36 is cylindrical is described in the present embodiment. The plate 31 is disposed in the modeling tank 36 and the modeling surface S is formed on the plate 31, and thus the plate 31 and the modeling surface S have the same shape and size in plan view.

The two powder feeding devices 40 are symmetrically installed with respect to the middle part of the work table 39 where the plate 31, the modeling tank 36, and the modeling surface S are provided. Each powder feeding device 40 includes a hopper (or tank) 34 accommodating the powder A. A discharge port 35 for discharging the powder A is provided in the lower portion of the hopper 34. The discharge port 35 has, for example, a rectangular shape that is long in the Y direction.

Multiple powder bodies constitute the powder A. Metallic powder or the like is used as the powder A. In addition, granules larger in particle size than the powder may be used as the powder A insofar as the granules can be melted and solidified by being irradiated with the electron beam B. The powder A has fluidity to a satisfactory extent and a bridge phenomenon in the hopper 34 is unlikely to occur.

A conveyance device 41 for dropping the powder A by a predetermined feeding amount is provided below the hopper 34. In other words, a conveyance surface 43 of the conveyance device 41 is disposed below the discharge port 35 of the hopper 34. The powder A is fed from the discharge port 35 to the conveyance surface 43 of the conveyance device 41. The conveyance device 41 moves the conveyance surface 43 in a conveyance direction (first direction) parallel to the X direction. Here, the conveyance direction is a direction approaching the modeling surface S from both sides of the modeling surface S (plate 31) in the X direction. The conveyance device 41 drops the powder A on the conveyance surface 43 from a front end portion 41a of the conveyance device 41.

Figure 5:
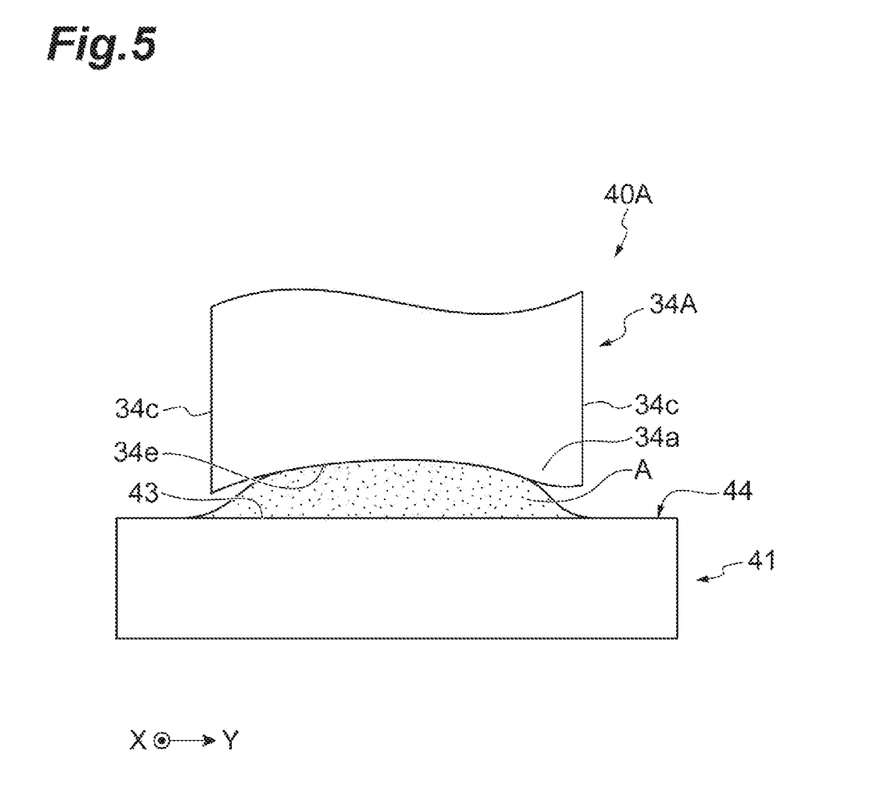
FIG. 5, which is a diagram illustrating a modification example of the hopper, is a diagram in which the lower portion of a hopper and the conveyance surface are viewed from the front end portion side of the conveyance device.

The shape of the hopper 34 may be any shape insofar as the powder A can be sequentially sent downward while being accommodated and can be discharged. In addition, the shape of the discharge port 35 may be any shape insofar as the powder A can be discharged and deposited onto the conveyance surface 43 of the conveyance device 41. The lower portion of the square tube-shaped hopper 34 includes a front wall portion 34a positioned on the downstream side of the discharge port 35 in the conveyance direction and a rear wall portion 34b positioned on the upstream side of the discharge port 35 in the conveyance direction. The front wall portion 34a and the rear wall portion 34b extend, for example, in parallel. The lower portion of the hopper 34 includes a pair of side wall portions 34c (see a hopper 34A according to the modification example that is illustrated in FIG. 5), which interconnect both X-direction end portions of the front wall portion 34a and the rear wall portion 34b.

A lower end 34e of the front wall portion 34a has a linear shape or the like and extends in the horizontal Y direction. The lower end 34e of the front wall portion 34a is separated from the conveyance surface 43 of the conveyance device 41. A predetermined gap G is formed between the lower end 34e of the front wall portion 34a and the conveyance surface 43 of the conveyance device 41 (see FIG. 3). The size of the gap G is, for example, constant in the Y direction, which is parallel to the conveyance surface 43 and perpendicular to the conveyance direction. The lower end 34e of the front wall portion 34a, the lower end of the rear wall portion 34b, and the lower ends of the pair of side wall portions 34c form, for example, a horizontally extending and rectangular opening. By the gap G being formed between this opening and the conveyance surface 43, the powder A is deposited on the conveyance surface 43 with a predetermined angle of repose (inclination angle) while spreading outward from the opening. As illustrated in FIG. 4, the Y-direction length of the discharge port 35 may be substantially equal to the Y-direction length of the modeling surface S (that is, the plate 31) or may be somewhat smaller than the Y-direction length of the modeling surface S (that is, the plate 31). It should be noted that a partition plate may be provided in the hopper 34 or a labyrinth structure may be formed in the hopper 34 so that a load applied to the conveyance device 41 is reduced.

Figure 3:
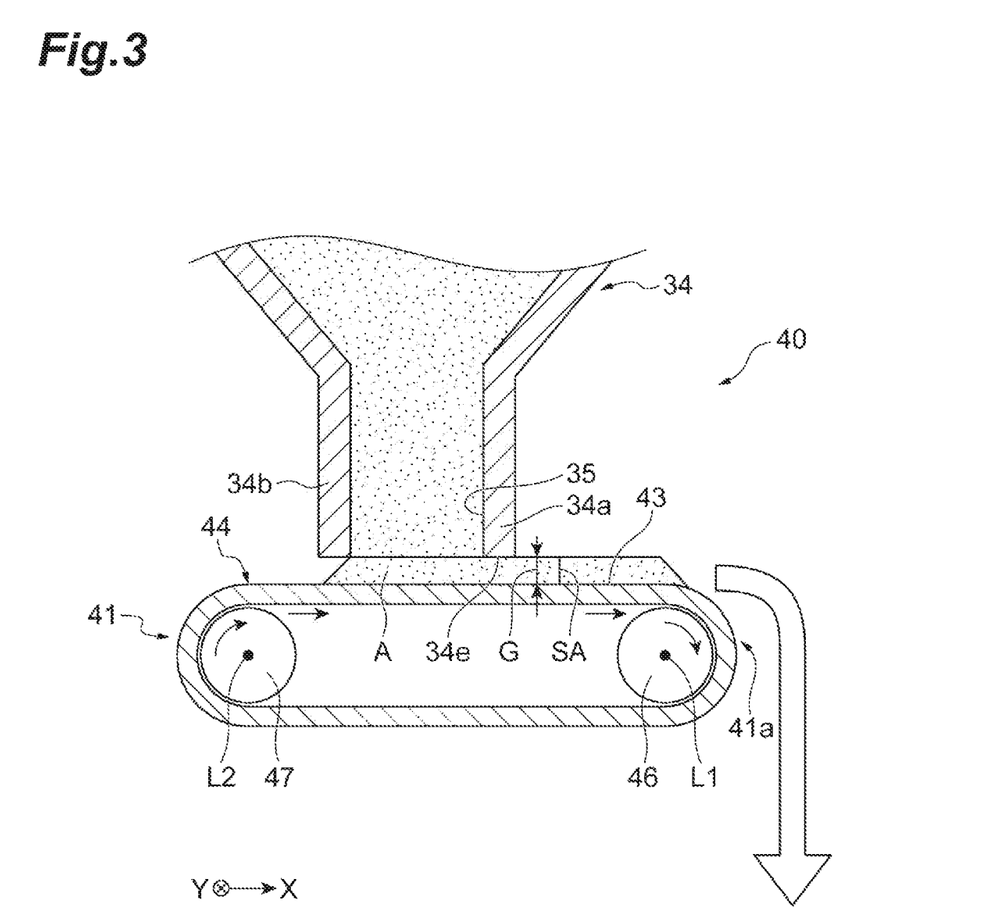
FIG. 3 is a cross-sectional view illustrating the lower portion of a hopper and a conveyance device.
Figure 4:
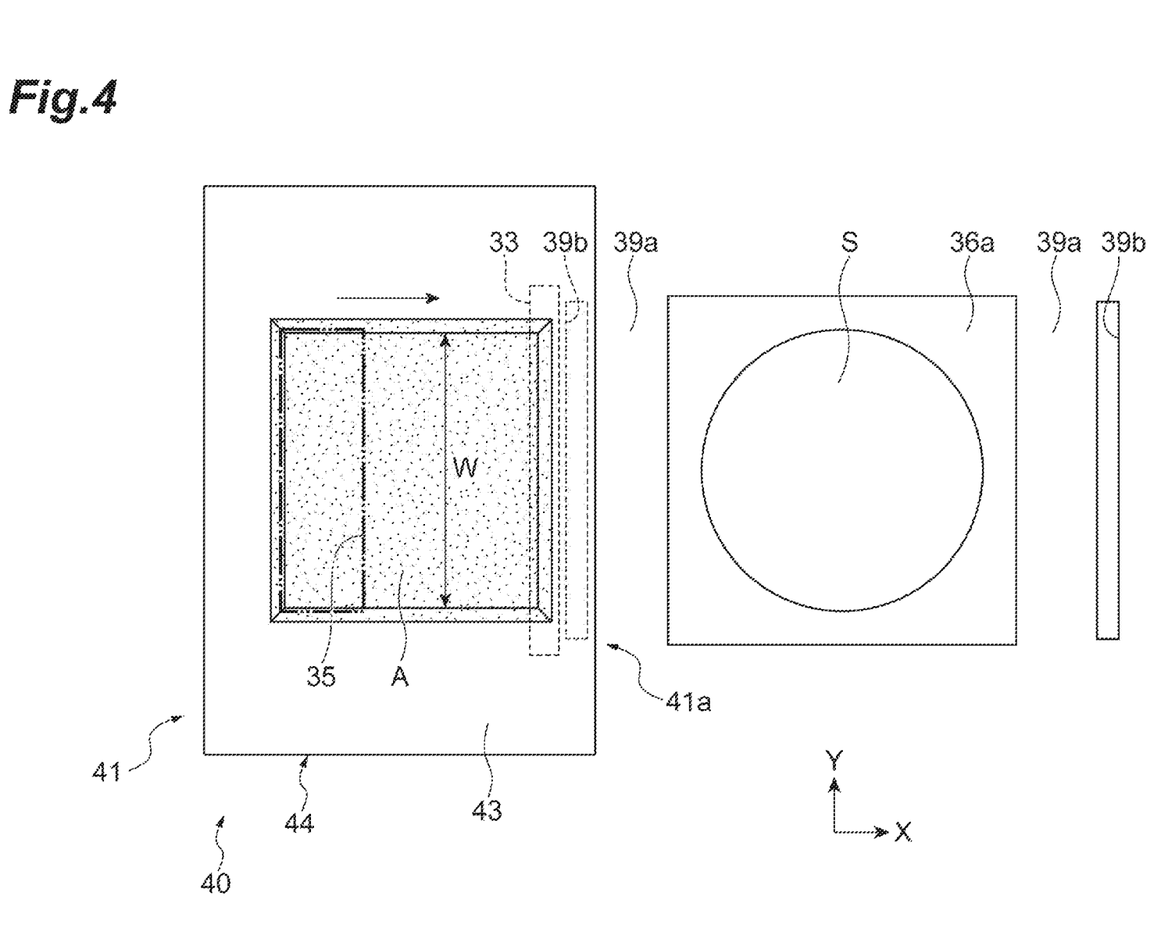
FIG. 4 is a plan view illustrating a modeling surface and a conveyance surface of the feeding device.

As illustrated in FIGS. 2 and 3, the conveyance device 41 includes a belt 44 that moves on a circular orbit in a loop shape along the X direction and a moving mechanism 45 that moves the belt 44 on the circular orbit. In other words, the conveyance device 41 is a belt conveyor-type conveyance device. The belt 44 is made of, for example, stainless steel. The belt 44 has strength allowing the belt 44 to withstand the load of the powder A placed on the belt 44 and is not deformed even when the belt 44 receives a load from the powder A in the hopper 34. The belt 44 is stretched over a roller 47 disposed on a side far from the modeling surface S and a roller 46 disposed on a side close to the modeling surface S. While the belt 44 is positioned on the upper sides of the rollers 46 and 47, the surface of the belt 44 forms the above-described conveyance surface 43. It is preferable that the surface of the belt 44 is rough.

A first rotational axis L1 of the roller 46 and a second rotational axis L2 of the roller 47 are parallel to each other and both the first rotational axis L1 and the second rotational axis L2 extend in the Y direction. Either the roller 46 or the roller 47, for example, the roller 47 may be connected to a drive motor 42 and driven to rotate. The drive motor 42 is electrically connected to the control unit 4 and operates in response to a control signal from the control unit 4. The drive motor 42 rotates by a predetermined number of rotations by being controlled by the control unit 4. The drive motor 42, the roller 46, and the roller 47 constitute the moving mechanism 45. It should be noted that a configuration other than the above may be adopted as the configuration of the moving mechanism 45 insofar as the belt 44 can be moved on the circular orbit.

The conveyance device 41 moves the conveyance surface 43 of the belt 44 in the conveyance direction and inverts the conveyance surface 43 in the front end portion 41a. In other words, the belt 44 is curved in the front end portion 41a, and then the belt 44 wraps around the rollers 46 and 47 and moves in the direction that is opposite to the above-described conveyance direction. The conveyance device 41 moves the belt 44 (causes the belt 44 to travel) in accordance with the number of rotations of the roller 47. The powder A deposited on the conveyance surface 43 is conveyed in the conveyance direction by the conveyance device 41 with a thickness corresponding to the gap G and dropped from the front end portion 41a. As a result, the conveyance device 41 drops the powder A by a predetermined feeding amount. In other words, the amount of feeding by the powder feeding device 40 depends on the movement amount of the conveyance surface 43 and a cross-sectional area SA obtained from the product of the thickness of the powder A corresponding to the gap G and a Y-direction width W of the powder A (see FIG. 4). In other words, the movement and feeding amounts of the belt 44 have a stepless proportional relationship. The resolution of the feeding amount can be steplessly adjusted. In the powder feeding device 40, the feeding amount can be adjusted to any amount by the movement amount of the conveyance surface 43 being adjusted, and thus the gap G does not have to be strictly managed. It should be noted that a cross-sectional area corresponding to the angle of repose described above may be added to the cross-sectional area SA.

The powder A dropped from the front end portion 41a of the conveyance device 41 is placed and deposited on the upper surface 39a of the work table 39 provided below the front end portion 41a and becomes deposited powder Aa. The front end portion 41a of the conveyance device 41 is positioned above the region that is the upper surface 39a of the work table 39 and is between the modeling tank 36 and a hole portion 39b. Because of this positional relationship, the deposited powder Aa is positioned between the modeling tank 36 and the hole portion 39b. The deposited powder Aa may be formed in a range including the modeling surface S (range larger than the modeling surface S) in the Y direction.

The application mechanism 33 is a member moving the deposited powder Aa onto the modeling surface S, feeding the powder A onto the modeling surface S, and leveling the powder A. The application mechanism 33 is a member extending with length in the horizontal Y direction. The length of the application mechanism 33 is larger than the Y-direction length of the modeling surface S (that is, the plate 31). The application mechanism 33 is provided so as to cover the entire modeling surface S in the Y direction when positioned on the modeling surface S (see FIG. 4). The application mechanism 33 is provided at a position separated with a gap from the upper surface 39a of the work table 39. The cross-sectional shape of the application mechanism 33 may be rectangular as illustrated in the drawing or may be another shape.

The application mechanism 33 is movable in the horizontal X direction from the upper surface 39a of the work table 39 onto the modeling surface S. More specifically, the application mechanism 33 is capable of reciprocating along the X direction so as to cross over the modeling surface S. While moving on the upper surface 39a and the modeling surface S, the application mechanism 33 maintains a predetermined distance from the upper surface 39a and the modeling surface S. The application mechanism 33 is moved by an actuator (not illustrated) or the like. The application mechanism 33 operates in response to a control signal from the control unit 4.

The control unit 4 is an electronic control unit controlling the entire additive manufacturing device 1. The control unit 4 is configured to include a computer and hardware such as a central processing unit (CPU), a read only memory (ROM), and a random access memory (RAM) and software such as a program stored in the ROM constitute the computer. The control unit 4 executes lifting and lowering control on the plate 31, operation control on the application mechanism 33, emission control on the electron beam B, operation control on the deflection coil 23, and so on. The control unit 4 outputs a control signal to the lifting and lowering machine 32, operates the lifting and lowering machine 32, and adjusts the position of the plate 31 in the up-down direction as the lifting and lowering control on the plate 31. The control unit 4 operates the application mechanism 33 before the emission of the electron beam B and levels the powder A on the plate 31 as the operation control on the application mechanism 33. The control unit 4 outputs a control signal to the electron gun unit 21 and causes the electron gun unit 21 to emit the electron beam B as the emission control on the electron beam B.

The control unit 4 outputs a control signal to the deflection coil 23 and controls the irradiation position of the electron beam B as the operation control on the deflection coil 23. For example, three-dimensional computer-aided design (CAD) data on the modeling object C, which is an object to be modeled, is input to the control unit 4. The control unit 4 generates two-dimensional slice data on the basis of this three-dimensional CAD data. The slice data is, for example, data on a horizontal cross section of the modeling object C and an aggregate of multiple data corresponding to an up-down position. The region where the powder A on the modeling surface S is irradiated with the electron beam B is determined on the basis of this slice data and a control signal is output to the deflection coil 23 in accordance with that region.

Subsequently, a powder collection device-related configuration will be described in detail. The additive manufacturing device 1 of the present embodiment includes a powder collection device 37 collecting the powder A that is not used for modeling from the work table 39. As illustrated in FIGS. 2 and 4, the hole portion 39b penetrating the upper surface 39a and the back surface side of the work table 39 is formed in the work table 39 provided in the chamber 30. Two hole portions 39b are formed on both sides of the modeling surface S in the X direction. These hole portions 39b are powder collection holes for dropping and collecting the surplus powder A remaining or protruding from the modeling surface S after being moved by the application mechanism 33 and fed onto the modeling surface S. As illustrated in FIG. 3, each hole portion 39b has a rectangular shape that is long in the Y direction. The length of the hole portion 39b is larger than the Y-direction length of the modeling surface S (that is, the plate 31). The hole portion 39b is formed in a range including the modeling surface S (range larger than the modeling surface S) in the Y direction.

As illustrated in FIG. 2, each hole portion 39b is provided between the modeling tank 36 and the stop position of the application mechanism 33. The powder A is deposited with a predetermined thickness in the rectangular region between the two hole portions 39b (region including the modeling surface S). After the application mechanism 33 passes through the modeling surface S, each hole portion 39b passes and drops the surplus powder A further moved by the application mechanism 33. Collection tanks 38 are provided below the respective hole portions 39b. The upper surface of the collection tank 38 is open upward, that is, toward the hole portion 39b. The surplus powder A dropped through the hole portion 39b is accommodated into the collection tank 38. The hole portions 39b and the collection tanks 38 constitute the powder collection device 37.

The additive manufacturing device 1 further includes a measuring device 48 that measures the amount of the powder A collected by the powder collection device 37. The measuring device 48 is provided on, for example, the back surface side of the work table 39 and the lower side of the hole portion 39b. A known sensor or the like can be used as the measuring device 48. The measuring device 48 measures the amount of the powder A collected by the powder collection device 37 by measuring the amount of the powder A that has passed through the hole portion 39b and dropped. The measuring device 48 outputs the measured collection amount of the powder A to the control unit 4. The control unit 4 is a control device that controls the conveyance device 41 on the basis of the collection amount of the powder A measured by the measuring device 48 and adjusts the movement amount of the conveyance surface 43. The control unit 4 stores, for example, the feeding amount of the powder A per movement amount of the conveyance surface 43. This numerical value may be obtained in advance in the early stage of the operation of the additive manufacturing device 1. The control unit 4 adjusts the movement amount of the conveyance surface 43 on the basis of the feeding amount of the powder A per movement amount of the conveyance surface 43 and controls the drive motor 42 such that the powder A is fed by a desired feeding amount. For example, in a case where the collection amount of the powder A (value measured by the measuring device 48) is larger than a predetermined threshold value (such as a preset target value), the control unit 4 may perform control such that the feeding amount of the powder A is reduced by the movement amount of the conveyance surface 43 being reduced.

It should be noted that each conveyance device 41 is controlled by the control unit 4 on the basis of a value measured by the measuring device 48, which is provided on the side opposite to each conveyance device 41 across the modeling surface S. In other words, the conveyance device 41 that is disposed on the left side of the modeling surface S in FIG. 2 is controlled on the basis of the measurement value of the measuring device 48 that is disposed on the right side of the modeling surface S. The conveyance device 41 that is disposed on the right side of the modeling surface S is controlled on the basis of the measurement value of the measuring device 48 that is disposed on the left side of the modeling surface S. Hereinafter, the terms of "right side" and "left side" will be used on the basis of the disposition of each device illustrated in FIG. 2.

An example of an additive manufacturing method based on the above configuration will be described. First, the powder A is dropped from the conveyance device 41 positioned on the left side of the modeling surface S in a state where the application mechanism 33 is positioned on the left side of the front end portion 41a of the conveyance device 41 disposed on the left side of the modeling surface S (in the rear in the movement direction of the application mechanism). When the deposited powder Aa is formed on the right side of the application mechanism 33 (in the front in the movement direction of the application mechanism), the application mechanism 33 is moved from the left side toward the right side of the deposited powder Aa and the deposited powder Aa is applied onto the modeling surface S. The surplus powder A that has not been applied is moved to the right side of the modeling surface S by the application mechanism 33 and drops into the hole portion 39b positioned on the right side of the modeling surface S. The collection amount of the powder A is measured by the measuring device 48 positioned on the right side of the modeling surface S.

Then, the powder A applied onto the modeling surface S is irradiated with an electron beam and the powder A in the region that corresponds to the shape of the modeling object C is melted and solidified with the application mechanism 33 moved to the right side of the modeling surface S. Subsequently, the plate 31 is lowered by one layer. As a result, the powder A on the modeling surface S (and the melted powder) is lowered by one layer.

Next, in a state where the application mechanism 33 is positioned on the right side of the front end portion 41a of the conveyance device 41 disposed on the right side of the modeling surface S (in the rear in the movement direction of the next application mechanism), the powder A is dropped from the conveyance device 41 positioned on the right side of the modeling surface S. When the deposited powder Aa is formed on the left side of the application mechanism 33 (in the front in the movement direction of the next application mechanism), the application mechanism 33 is moved from the right side toward the left side of the deposited powder Aa and the deposited powder Aa is applied onto the modeling surface S. The surplus powder A that has not been applied is moved to the left side of the modeling surface S by the application mechanism 33 and drops into the hole portion 39b positioned on the left side of the modeling surface S. The collection amount of the powder A is measured by the measuring device 48 positioned on the left side of the modeling surface S.

Then, the powder A applied onto the modeling surface S is irradiated with an electron beam and the powder A in the region that corresponds to the shape of the modeling object C is melted and solidified with the application mechanism 33 moved to the left side of the modeling surface S. Subsequently, the plate 31 is lowered by one layer. As a result, the powder A on the modeling surface S (and the melted powder) is lowered by one layer.

Next, in a state where the application mechanism 33 is positioned again on the left side of the front end portion 41a of the conveyance device 41 disposed on the left side of the modeling surface S (in the rear in the movement direction of the application mechanism), the powder A is dropped from the conveyance device 41 and the deposited powder Aa is formed on the right side of the application mechanism 33 (in the front in the movement direction of the application mechanism). At this time, the feeding amount of the powder A (that is, the amount of the deposited powder Aa) is controlled by the conveyance device 41 being controlled on the basis of the measurement value of the measuring device 48 at the time of the previous powder application (application of the powder fed from the conveyance device 41 positioned on the left side of the modeling surface S). Then, powder application by means of the application mechanism 33 is performed as before.

The modeling object C is additive-manufactured by the above steps being repeated.

According to the powder collection device 37, the measuring device 48, and the control unit 4, the feeding amount of the powder A can be controlled with high accuracy. In addition, even in a case where the feeding amount needs to be changed due to a change in the physical property value of the powder A, it is possible to respond to the necessity simply by changing the movement amount of the belt 44 (conveyance surface 43). In other words, the trouble of mechanical adjustment is omitted and cost reduction can be achieved.

According to the powder feeding device 40 of the present embodiment described above, the powder A discharged from the discharge port 35 of the hopper 34 is deposited onto the conveyance surface 43 of the conveyance device 41. The predetermined gap G is defined by the conveyance surface 43 and the lower end 34e of the front wall portion 34a of the hopper 34. When the conveyance surface 43 moves in the conveyance direction, the deposited powder A is conveyed with a thickness corresponding to the gap G so as to be leveled at the lower end 34e of the front wall portion 34a. Then, the powder A arrives at the front end portion 41a of the conveyance device 41 and is dropped from the front end portion 41a. As a result, it is possible to adjust the amount of dropping of the powder A, that is, the feeding amount to any amount by adjusting the movement amount of the conveyance surface 43 in the conveyance device 41. Accordingly, it is possible to feed the powder A by a desired feeding amount with this powder feeding device 40.

In the above-described device according to the related art, the powder replenishing means has a configuration in which a columnar member rotates and gap adjustment is required so that powder leakage from the gap between the columnar member and the surface that surrounds the outer peripheral surface of the member is suppressed. Accordingly, operation may be hindered depending on disturbance (heat, material properties). However, according to the powder feeding device 40, the gap G between the hopper 34 and the belt 44 does not significantly affect leakage of the powder A, and thus the accuracy of machining assembly can be reduced. As a result, cost reduction can be achieved. In addition, a reduction in wear of structural components, a long service life, contamination prevention, and so on are realized since a mechanical seal portion is not present. In addition, the powder feeding device 40 is resistant to gap changes, and thus the powder feeding device 40 is unlikely to be affected by disturbance and is resistant to a change in the physical property value of the powder A and a structural change attributable to temperature.

In addition, the following various effects are obtained. Firstly, the recyclability of the powder A, that is, the recycling efficiency is improved. The recycling efficiency of the powder A is, for example, a value obtained by dividing "powder used for modeling" by "powder required for preparation". "Powder required for preparation" is the sum of "powder used for modeling" and "assumed surplus powder amount", and thus a decrease in surplus powder results in a decrease in "powder required for preparation" and powder recycling efficiency improvement. Secondly, a deterioration of the quality of the powder A is suppressed. During the application operation of the powder A, the powder A passes over the modeling surface S, and thus the surplus powder is instantaneously heated. Accordingly, the surplus powder is more likely to entail a deterioration in quality than the powder in the hopper 34. As a result, decreasing the surplus powder as in the present embodiment is effective in terms of powder quality deterioration suppression. Thirdly, the device can be reduced in size. By reducing the surplus powder, it is possible to reduce both the feeding amount of the powder A and the collection amount of the powder A. As a result, the hopper 34 or the collection tank 38 can be reduced in size.

The conveyance device 41 is configured to include the moving mechanism 45 and the belt 44, and thus the powder A can be conveyed with ease and reliability.

According to the additive manufacturing device 1 of the present embodiment, the powder A can be fed by a desired feeding amount, and thus surplus powder generation can be suppressed. As a result, effects such as improvement of the recyclability of the powder A, powder quality deterioration suppression, and device size reduction are exhibited during the additive manufacturing.

In addition, the collection amount of the powder A is measured by the measuring device 48 and the control unit 4 adjusts the movement amount of the conveyance surface 43 on the basis of the collection amount. Accordingly, the feeding amount of the powder A can be controlled with high accuracy. When the control unit 4 performs the above-described control in the additive manufacturing device 1 including the plurality of conveyance devices 41 and the plurality of measuring devices 48 corresponding to the feeding of the powder A by each conveyance device 41 and the subsequent application and collection, the previous amount of the surplus powder A is reflected in the latest feeding control on the powder A. As a result, each of the above-described effects associated with surplus powder generation suppression can be more suitably achieved.

A powder feeding device 40A according to a modification example will be described below with reference to FIG. 5. The powder feeding device 40A is different from the powder feeding device 40 in that the powder feeding device 40A includes the hopper 34A including the lower end 34e shaped so as to change the gap G in the horizontal Y direction instead of the lower end 34e of the hopper 34 forming the constant gap G. In the powder feeding device 40A, the size of the gap G is not uniform in the axial direction (Y direction, second direction). In other words, the front wall portion 34a of the hopper 34A has a shape in which the height of the lower end 34e changes in the Y direction. The height of the gap G is, for example, larger in the middle portion of the belt 44 in the width direction (axial direction of the rollers 46 and 47) than in the end portion in the width direction. In a case where the shape of the modeling surface S is a circular shape or the like, it is desirable that more powder A is fed in the middle portion than in the width-direction end portion. According to the powder feeding device 40A, the powder can be fed by an appropriate feeding amount in accordance with the shape of the modeling surface. It should be noted that a case where the modeling surface S is circular is non-limitative and this aspect is advantageous insofar as the length, that is, the width in the movement direction of the application mechanism (X direction) becomes smaller toward the width-direction end portion in the shape. Moreover, the height of the gap G increases from the width-direction end portion toward the middle portion, and thus the powder can be fed by an appropriate feeding amount to the circular modeling surface S in particular.

In this regard, since distribution cannot be created in the structure of the related art, surplus powder was generated by 25% or more when powder was fed to the circular modeling tank. By distribution being formed through a change in the gap G between the hopper 34 and the belt 44, the thickness of the powder A deposited onto the conveyance surface 43 and conveyed also changes. As a result, a distribution can be given in the feeding amount of the powder A in the width direction. As a result, the powder can be fed by an appropriate feeding amount in accordance with the shape of the modeling surface S and surplus powder generation can be suppressed in a case where, for example, the shape of the modeling surface S is not a simple rectangular shape. In other words, a difference in required feeding amount is caused between central and end portions in a case where the modeling tank 36 has a cylindrical shape. Surplus powder reduction and cost reduction can be achieved by distribution formation. In addition, in other words, in the powder feeding device 40A, the height of the lower end 34e corresponding to the region, the size of the gap G, and the amount of dropping of the powder are adjusted in accordance with the dimension of the modeling surface S in the X direction (application direction). Specifically, the height of the lower end 34e corresponding to the region, the size of the gap G, and the amount of dropping of the powder increase as the dimension of the modeling surface in the X direction (application direction) increases. In this manner, the powder A can be fed by an appropriate feeding amount in accordance with the shape of the modeling surface S.

In the powder feeding device 40A, the distribution can be given in the feeding amount of the powder A in the width direction by the shape of the lower end 34e of the front wall portion 34a of the hopper 34 being devised.

Figure 6A:
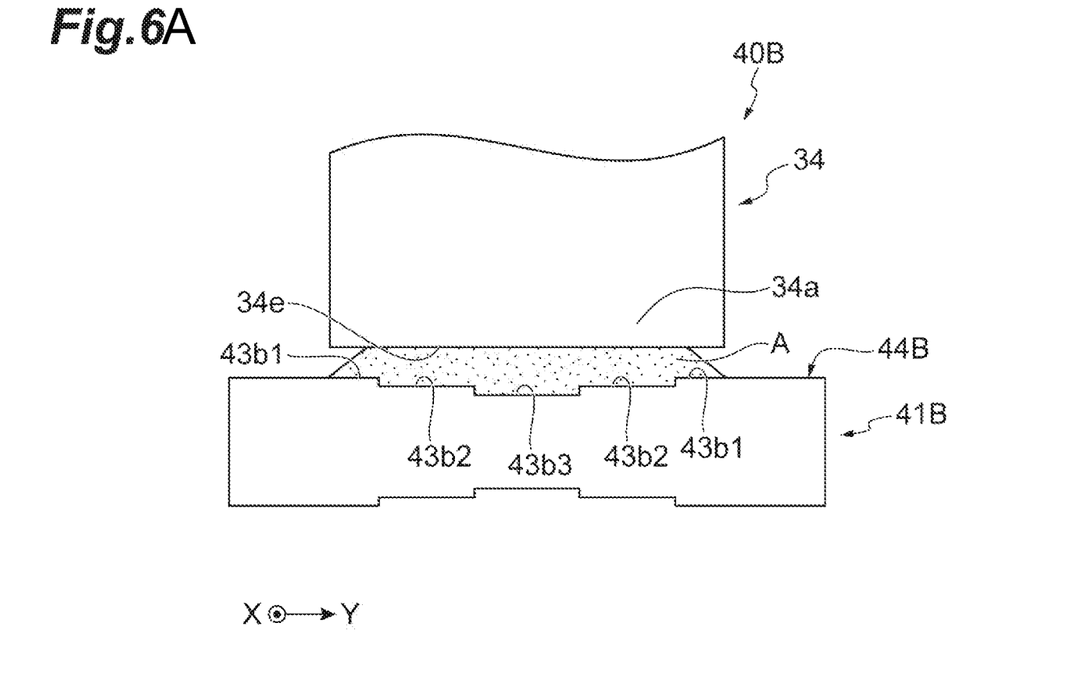
FIGS. 6A and 6B, which are diagrams illustrating modification examples of the conveyance device, are diagrams in which the lower portion of the hopper and a conveyance surface are viewed from the front end portion side of a conveyance device.

Subsequently, powder feeding devices 40B and 40C according to other modification examples will be described with reference to FIGS. 6A and 6B. In the powder feeding device 40B illustrated in FIG. 6A, the height of the lower end 34e of the hopper 34 is constant in the Y direction. On the other hand, a conveyance device 41B has a shape in which the height of the conveyance surface 43 changes in stages in the Y direction. As a result, the gap G in the width direction of a belt 44B changes. Here, the width direction of the belt 44B is the second direction orthogonal to the conveyance direction (first direction) parallel to the X direction. In the powder feeding devices 40B and 40C, the size of the gap G is not uniform in the axial direction (Y direction, second direction). More specifically, the belt 44B of the conveyance device 41B includes two first step portions 43b1 formed in both width-direction end portions and two second step portions 43b2 formed so as to communicate with the middle sides of the first step portions 43b1 in the axial direction. The second step portion 43b2 is lower than the first step portion 43b1. The belt 44B further includes one third step portion 43b3 formed between the two second step portions 43b2 and in the middle portion in the axial direction. The third step portion 43b3 is even lower than the second step portion 43b2. Such a surface shape of the belt 44B can be obtained by, for example, a plurality of belt pieces being stacked and the number of the stacked pieces being changed. In addition, in other words, in the powder feeding device 40B, the height of the conveyance surface 43 corresponding to the region and the size of the gap G are set in stages in accordance with the dimension of the modeling surface S in the X direction (application direction). Specifically, the height of the conveyance surface 43 corresponding to the region decreases and the size of the gap G and the amount of dropping of the powder increase as the dimension of the modeling surface in the X direction (application direction) increases.

It is possible to distribute the feeding amount of the powder A in the width direction by devising the shape of the conveyance surface of the conveyance device 41B (such as the surface of the belt 44B) as in the powder feeding device 40B. Also with the powder feeding device 40B, the powder A can be fed by an appropriate feeding amount in accordance with the shape of the modeling surface S and surplus powder generation can be suppressed.

Figure 6B:
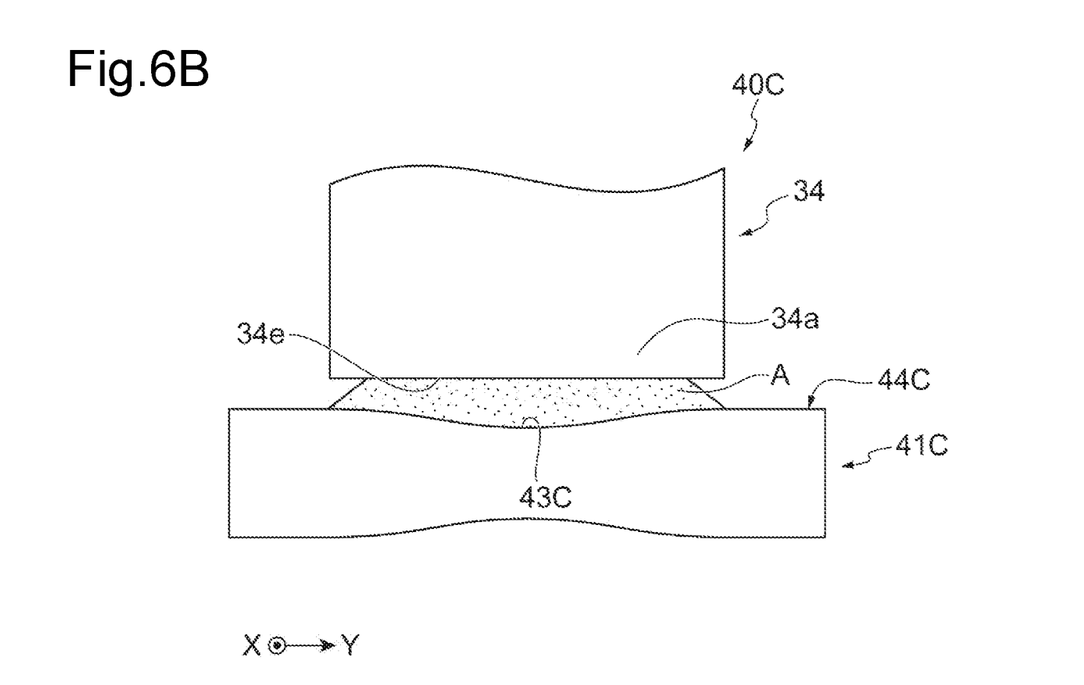

In addition, a conveyance device 41C has a shape in which the height of a conveyance surface 43C gently (continuously) changes in the Y direction as in the powder feeding device 40C illustrated in FIG. 6B. As a result, the gap G in the width direction of a belt 44C changes. Also with the powder feeding device 40C, the powder A can be fed by an appropriate feeding amount in accordance with the shape of the modeling surface S and surplus powder generation can be suppressed.

Figure 7:
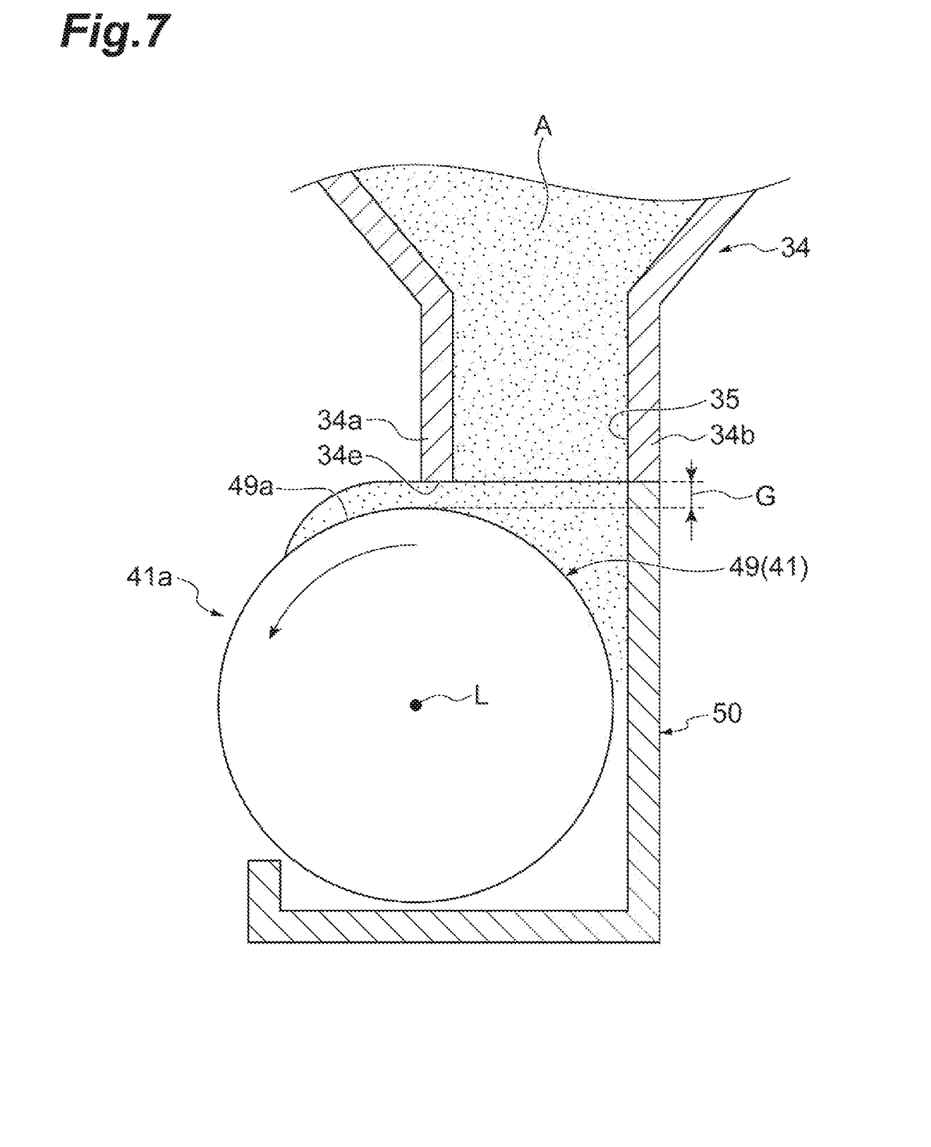
FIG. 7 is a diagram illustrating a powder feeding device according to another embodiment of the present disclosure.

A powder feeding device according to another embodiment will be described with reference to FIG. 7. In the conveyance device that is illustrated in FIG. 7, a roller 49 having a peripheral surface 49a as a conveyance surface is provided instead of a belt conveyor-type conveyance device. The roller 49 is accommodated in a casing 50 and a part of the peripheral surface of the roller 49 (front end portion 41a) is exposed. The roller 49 is driven to rotate by, for example, a drive motor (not illustrated) and rotates about a rotational axis L. The gap G is formed between the peripheral surface 49a of the roller 49 and the lower end 34e of the hopper 34. It is preferable that the peripheral surface 49a of the roller 49 is rough. The roller 49 has a shape and size (that is, a diameter) that allows a state where the powder A is deposited on the peripheral surface 49a to be maintained. The roller 49 moves the peripheral surface 49a in the circumferential direction (first direction) as the roller 49 rotates. The conveyance direction in this case (first direction) has a circular arc shape. The movement amount of the conveyance surface is the movement amount of the peripheral surface 49a of the roller 49 and is determined by the radius and rotation angle of the roller 49. The roller 49 rotates by a predetermined rotation angle and inverts the peripheral surface 49a in the front end portion 41a by the control unit 4 controlling the drive motor. At this time, the powder A deposited on the peripheral surface 49a with a thickness corresponding to the gap G is dropped from the front end portion 41a. Actions and effects similar to those of the above-described powder feeding device 40 are achieved by means of the powder feeding device including such a roller-type conveyance device.

It should be noted that the diameter of the roller 49 may be changed in the axial direction (Y direction, second direction) in the powder feeding device including the roller-type conveyance device. Then, the gap G can be changed in the Y direction as in the case of the modification examples illustrated in FIGS. 5 and 6A-B. Accordingly, effects similar to those of the modification examples illustrated in FIGS. 5 and 6A-B can be anticipated. For example, the roller 49 may be configured such that the diameter of the roller 49 decreases from the end portion toward the middle portion in the axial direction (Y direction, second direction). In this configuration, the height of the gap G is larger in the middle portion than in the axial end portion of the roller 49. Since the height of the gap G increases from the axial end portion toward the middle portion of the roller 49, the powder can be fed by an appropriate feeding amount to the circular modeling surface S in particular. Also in this form, the diameter of the roller 49 corresponding to the region and the size of the gap G may be set in accordance with the dimension of the modeling surface S in the X direction (application direction). For example, the diameter of the roller 49 corresponding to the region may decrease and the size of the gap G and the amount of dropping of the powder may increase as the dimension of the modeling surface in the X direction (application direction) increases.

The present invention is not limited to the embodiments of the present disclosure that have been described above. For example, the shape of the modeling tank 36 is not limited to a cylindrical shape and the shape of the modeling tank 36 may be a square tube shape having a rectangular cross section or a polygonal cross section. The shape of the plate 31 is not limited to a circular shape and the plate 31 may be rectangular or polygonal. The present invention is applicable also in a case where the modeling surface S is not circular. The size of the gap G corresponding to the region and the amount of dropping of the powder may be set in accordance with the dimension of the modeling surface S in the X direction (application direction). The configuration of the application mechanism 33 (or recoater) is not limited to the configuration described above. For example, the application mechanism 33 may have a plate shape or may be configured to include a roller unit, a rod-shaped member, a brush unit, or the like. As for the discharge port 35 of the hopper 34, only the front wall portion 34a may form the gap G with the conveyance surface 43 and the rear wall portion 34b and the side wall portion 34c may not form the gap G of the same size. A change in the gap G in the width direction of the belt 44B may be realized by the shapes of both the lower end 34e of the hopper 34 and the conveyance surface 43 of the conveyance device 41 being changed. The first direction, which is the conveyance direction of the conveyance device, is not limited to being horizontal and may be slightly inclined with respect to a horizontal plane. The first direction may be curved without being limited to being linear.

The additive manufacturing device is not limited to a manufacturing device to which an electron beam melting method is applied and the additive manufacturing device may be, for example, a manufacturing device to which a laser melting method is applied. In other words, the beam that is emitted to the powder A in the additive manufacturing device may be a laser beam. The beam that is emitted to the powder A in the additive manufacturing device may be a charged particle beam, which is a concept including an electron beam and an ion beam. The beam that is emitted to the powder A in the additive manufacturing device may be an energy beam capable of feeding energy to powder A. The additive manufacturing device is applicable to any type of manufacturing device that feeds the powder A by dropping the powder A.

In addition, manufacturing devices to which the present invention can be applied are not limited to powder bed fusion bonding-type manufacturing devices. The present invention is also applicable to, for example, a binding agent injection-type manufacturing device that selectively binds powder by injecting a binder (binding agent) onto a powder bed. From another viewpoint, the present invention is applicable to any powder bed-type additive manufacturing device. The present invention is applicable to a powder bed-type additive manufacturing device employing any type of powder or heat source. The present invention is also applicable to a powder sintering method. The powder A (modeling material) may be resin or the like without being limited to metal.

According to some embodiments of the present disclosure, powder can be fed by a desired feeding amount.

REFERENCE SIGNS LIST

1: additive manufacturing device, 4: control unit (control device), 31: plate, 33: application mechanism, 34, 34A: hopper, 34a: front wall portion, 34e: lower end, 35: discharge port, 36: modeling tank, 37: powder collection device, 38: collection tank, 39: work table, 39b: hole portion, 40, 40A, 40B, 40C: powder feeding device, 41, 41B, 41C: conveyance device, 41a: front end portion, 42: drive motor, 43: conveyance surface, 44, 44B, 44C: belt, 45: moving mechanism, 46: roller, 47: roller (conveyance device), 48: measuring device, 49: roller, 49a: peripheral surface (conveyance surface), A: powder, Aa: deposited powder, B: electron beam, C: modeling object, G: gap, S: modeling surface.

The invention claimed is:

1. An additive manufacturing device comprising:
a work table;
a modeling surface;
a recoater; and
a powder feeder including:
a hopper accommodating powder, the hopper including a discharge port configured to discharge the powder and the discharge port being provided in a lower portion of the hopper; and
a conveyor including a conveyance surface disposed below the discharge port of the hopper and configured to move the conveyance surface in a first direction and invert the conveyance surface in a front end portion, wherein
the conveyor includes a belt forming the conveyance surface that is configured to move on a circular orbit in a loop shape to move the portion of the belt below the discharge port along the first direction;
the hopper includes a front wall portion positioned on a downstream side of the discharge port in the first direction, and
a predetermined gap formed between a lower end of the front wall portion of the hopper and the conveyance surface of the conveyor, and
the work table provided below the front end portion of the conveyor and having an upper surface upon which the powder falls from the conveyor;
the modeling surface exposed upward beside the work table; and
the recoater configured to move across a position of the front end portion of the conveyor in the first direction to spread and level the powder across the modeling surface,
whereby powder deposited on the conveyance surface is conveyed in the first direction by the conveyor with a thickness corresponding to the predetermined gap, dropped from the conveyor front end portion onto the work table upper surface, and levelly spread across the modeling surface by the movement of the recoater;
wherein the powder feeder is configured to permit the predetermined gap between the lower end of the front wall portion and the conveyance surface to be selectively changed; and
wherein the powder feeder is configured to define the predetermined gap by the front wall portion lower end having a shape that is not straight.

2. The additive manufacturing device according to claim 1, wherein the conveyor includes a drive motor configured to move the belt on the circular orbit.

3. An additive manufacturing device comprising:
a work table;
a modeling surface;
a recoater; and
a powder feeder including:

a hopper accommodating powder, the hopper including a discharge port configured to discharge the powder and the discharge port being provided in a lower portion of the hopper; and a conveyor including a conveyance surface disposed below the discharge port of the hopper and configured to move the conveyance surface in a first direction and invert the conveyance surface in a front end portion, wherein the conveyor includes a belt forming the conveyance surface that is configured to move on a circular orbit in a loop shape to move the portion of the belt below the discharge port along the first direction;

the hopper includes a front wall portion positioned on a downstream side of the discharge port in the first direction, and a predetermined gap formed between a lower end of the front wall portion of the hopper and the conveyance surface of the conveyor, and the work table provided below the front end portion of the conveyor and having an upper surface upon which the powder falls from the conveyor;

the modeling surface exposed upward beside the work table; and the recoater configured to move across a position of the front end portion of the conveyor in the first direction to spread and level the powder across the modeling surface, whereby powder deposited on the conveyance surface is conveyed in the first direction by the conveyor with a thickness corresponding to the predetermined gap, dropped from the conveyor front end portion onto the work table upper surface, and levelly spread across the modeling surface by the movement of the recoater; and wherein the powder feeder is configured to define the predetermined gap by the conveyance surface having a shape that is not flat such that the thickness of the deposited powder varies across the conveyance surface.

4. The additive manufacturing device according to claim 3, wherein the conveyor includes a drive motor configured to move the belt on the circular orbit.

5. The additive manufacturing device according to claim 1, wherein the powder feeder is configured to define the predetermined gap by the conveyance surface having a shape that is not flat.

6. The additive manufacturing device according to claim 2, wherein the powder feeder is configured to define the predetermined gap by the conveyance surface having a shape that is not flat.

7. The additive manufacturing device of claim 1 further comprising:
a beam emission unit configured to emit a beam toward powder spread across the modeling surface by the recoater.

8. The additive manufacturing device according to claim 7, further comprising:
a powder collection device configured to collect powder surplus remaining after being spread across the modeling surface or protruding from the modeling surface;
a measuring device configured to measure powder collected by the powder collection device to determine a powder collection amount; and
a conveyor speed control device configured to adjust a speed of the conveyance surface in the first direction on the basis of the powder collection amount measured by the measuring device.

9. The additive manufacturing device of claim 3 further comprising:
a beam emission unit configured to emit a beam toward powder spread across the modeling surface by the recoater.

10. The additive manufacturing device according to claim 9, further comprising:
a powder collection device configured to collect powder surplus remaining after being spread across the modeling surface or protruding from the modeling surface;
a measuring device configured to measure powder collected by the powder collection device to determine a powder collection amount; and
a conveyor speed control device configured to adjust a speed of the conveyance surface in the first direction on the basis of the powder collection amount measured by the measuring device.

* * * * *